Patented Aug. 14, 1951

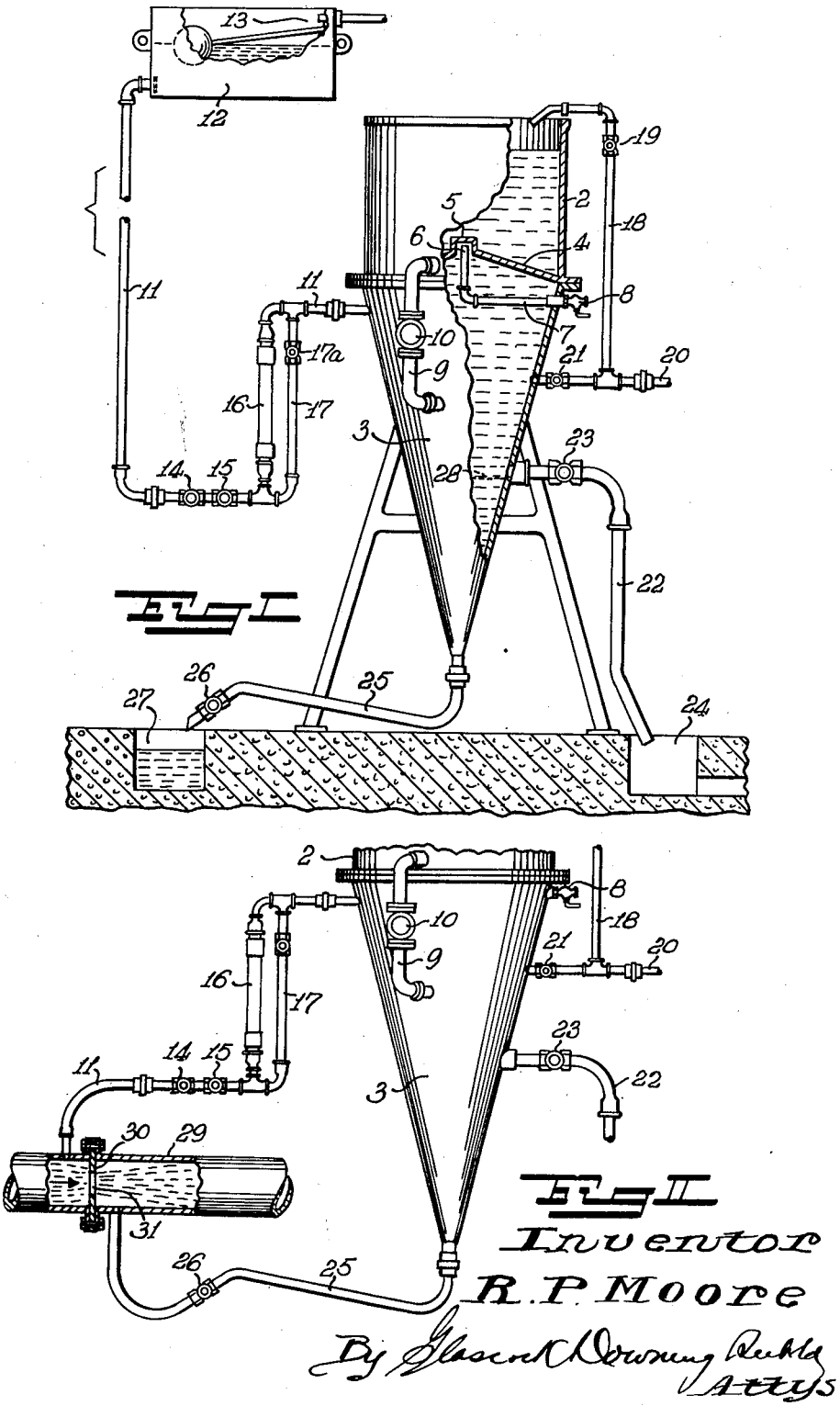

2,564,543

UNITED STATES PATENT OFFICE 2,564,543

LIME FEEDING PROCESSES AND APPARATUS SUITABLE FOR WATER-SOFTENING PLANTS

Richard Pierpont Moore, Roodekop, Germiston, Transvaal, Union of South Africa

Application January 25, 1946, Serial No. 643,368
In the Union of South Africa March 1, 1945

10 Claims. (Cl. 210—16)

Hydrated lime present in a body of still water has the property of settling fairly rapidly to a stable consistency (i. e. a certain water-to-solid ratio) which thereafter remains substantially unchanged for a considerable period. For instance after a settling period of about 2 to 6 hours depending on the quality of lime used, the water-to-solid ratio remains materially constant for at least several days.

The weight of lime per unit of volume of the settled lime pulp is much the same as that of dry lime: whilst on the other hand the mobility and capacity for sub-division of the settled lime far exceeds that of the solid lime. The former is accordingly in a much superior condition to the latter for feeding out in measured quantities or at a constant rate.

According to the invention a process of preparing lime for dosing and of using the prepared lime for dosing comprises the steps of mixing the lime with a body of water, allowing it to settle to the bottom of said body, and thereafter withdrawing the settled lime from said body of water for feeding, without material change of the water-to-solid ratio; and feeding it in that state to the liquid being treated. By dosing is meant the introduction into a liquid mass of measured quantities of lime, either continuously or in batches. Generally the liquid dosed is water for the purpose of softening and/or purifying it.

Apparatus according to the invention comprises means to form from lime and water a pulp which is unstable as to its consistency, an enclosed inverted conical settling tank, valve means to introduce said pulp into the tank, means to withdraw from the lower part of the tank, lime which has settled therein, a valve-controlled water inlet towards the top of the tank, a valve-controlled air pipe connecting the upper part of the tank with the atmosphere, a pipe connecting the withdrawing means with the point of application of the dose, and a separate valve to draw off from the tank the separated water constituent of the said pulp.

The invention also provides means to flow water into the upper part of the tank to displace settled lime from the lower part of the tank; and a separate valve to draw off from the tank the separated water constituent of the said pulp as well as displacing water which has flowed into the tank, such valve being well below the upper end of the tank.

The lime is settled in a tank constructed with a pointed bottom, which latter both facilitates the settlement and also holds the settled lime in a favourable condition and position for being discharged from a pipe connected to the point.

An embodiment of apparatus according to the invention is illustrated in the drawings in which Figure I is a side view partly sectioned of the apparatus, and Figure II is a modified arrangement of the embodiment of Figure I adapted for proportional feeding under pressure.

In the drawings 2 indicates a mixing tank of cylindrical shape and 3 a settling tank shaped as an inverted cone, the tanks being separated from one another by a conical cross-member 4 formed at its upper end as a dome 5 in which is positioned one end 6 of an air-release pipe 7 comprising a cock 8.

The tanks 2, 3 are inter-connected by a charging pipe 9 comprising a charging valve 10, the pipe 9 entering the settling tank 3 at an angle to the tank wall in order to flush the upper sides of the cone whilst recharging.

Water is supplied to the settling tank by means of a pipe 11 communicating with a tank 12 mounted at a substantial head above the settling tank 3, and provided with a ball valve 13 to regulate the volume of water in the tank 12.

The pipe 11 comprises stop and regulating valves 14, 15 respectively, a meter 16 and a meter by-pass branch 17 comprising a cock 17a.

Water is supplied to the mixing tank 2 through a pipe 18 comprising a cock 19; the pipe connecting with a branch 20 which comprises the cock 21 and communicates with the settling tank 3.

A drainage pipe 22 comprising a cock 23 enters the tank roughly midway its length and terminates at its free end in a sump 24.

The pointed end of the settling tank 3 is connected with a discharge pipe 25 of gooseneck shape to prevent air entering the tank, said pipe 25 comprising a discharge valve 26, and arranged to discharge into a mixing channel 27 (Figure I).

In operation, lime and water are supplied to the mixing tank 2 and are mixed therein, and means may, if desired, be provided for removing impurities and breaking up lumps, or for mechanical mixing. The resulting pulp passes through the pipe 9 into the settling tank 3, the discharge valve 26 being kept closed. When the required quantity of pulp has been introduced into the settling tank 3, the cock 21 is opened and the tank 3 is completely filled with water, air in the tank escaping through cock 8.

The lime is then permitted to settle in the tank 3, the optimum settlement period being from three to four hours. In such settling, the construction of the tank with a pointed bottom facilitates the settlement and also holds the settled line in a favourable condition and position for being discharged through the discharge pipe 25.

Various arrangements may be provided for causing the settled lime to pass out of the tank, the operation of the arrangement in Figure I being that displacing water is admitted through pipe 11, and the discharge valve 26 opened. The settled lime is displaced by the incoming water and passes through the discharge pipe 25 into the mixing channel 27.

The quantity of displacing water entering the tank, and therefore the quantity of lime being displaced, may be measured by the meter 16 which may be calibrated in pounds of lime per hour.

The procedure outlined above may be by batch operation comprising the feeding of a batch of unsettled lime pulp from the mixing tank 2 to the settling tank 3, its settlement therein, discharge of the settled lime and discharge of the displacing water from the tank. A fresh batch of lime is then introduced into the settling tank and the cycle of operations repeated. In normal operation, however, it is preferred not to discharge the complete volume of settled lime in the tank 3, the volume below the dotted line 28 being retained in the tank and the displacing water being discharged through the pipe 22 into the sump 24; the volume of settled lime retained in the tank being sufficient to supply lime required for feeding while the new batch is settling. This feeding operation may be resumed immediately after recharging.

In the feeding arrangement illustrated in Figure II, 29 indicates a conduit through which the water into which the lime is to be fed flows. The arrangements for the settling of the lime in the settling tank 3 are identical with those of Figure I; but, instead of displacing water being supplied from an overhead tank, it is provided from the conduit itself through the pipe 11.

The discharge pipe 25 communicates with the conduit downstream of the pipe 11; and a plate 30 having an orifice 31 is provided in the conduit between the pipes 11 and 25.

The arrangement thus constitutes a by-pass of the orifice plate 30 through the tank 3; and the flow of water from the conduit 29 through the pipe 11 into the tank 3 which takes place when there is a flow through the conduit 29 (which is equivalent to the volume of lime displaced and discharged through pipe 25 into the conduit) is proportional to the flow through the orifice 31, and therefore to the flow through the conduit 29.

I claim:

1. The process of preparing lime for dosing, and using the prepared lime for dosing which consists in forming a body of lime settled in quiescent water to a stable water-to-solid ratio, and withdrawing settled lime from the body without material alteration of said ratio and feeding it in that state to the liquid to be treated.

2. The process claimed in claim 1 in which said body is formed by allowing lime to settle in the water for a period in excess of two hours.

3. The process of preparing lime for dosing, and using the prepared lime for dosing which consists in mixing lime with water to form a pulp unstable as to its consistency, introducing such pulp together with water into a settling tank, providing tranquil conditions within the settling tank for the lime pulp to settle in the water to a stable water-to-solid ratio, and thereafter withdrawing settled lime from the tank without material alteration of said ratio, and feeding it in that state to the liquid to be treated.

4. The process claimed in claim 3 in which the lime pulp is allowed to settle in the water within the settling tank for a period in excess of two hours.

5. The process of preparing lime for dosing, and using the prepared lime for dosing which consists in forming a body of lime settled in quiescent water to a stable water-to-solid ratio, withdrawing a portion of said body without material alteration of said ratio and feeding the lime thus withdrawn to the liquid to be treated.

6. The process of preparing lime for dosing, and using it for dosing which comprises the steps of mixing lime with water to form a pulp unstable as to its consistency, introducing such pulp together with water into a settling tank, providing tranquil conditions within the settling tank for the lime pulp to settle in the water to a stable water-to-solid ratio, withdrawing a portion of the settled lime for dosing without material alteration of said ratio, feeding it to the liquid to be treated, and introducing further pulp into the tank for settlement.

7. Apparatus for preparing lime for dosing and for using the prepared lime for dosing, comprising means to form from lime and water a pulp which is unstable as to its consistency, an enclosed inverted conical settling tank, valve means to introduce said pulp into the tank, means to withdraw from the lower part of the tank lime which has settled therein, a valve-controlled water inlet towards the top of the tank, a valve-controlled air pipe connecting the upper part of the tank with the atmosphere, a pipe connecting the withdrawing means with the point of application of the dose, and a separate valve to draw off from the tank the separated water constituent of the said pulp.

8. Apparatus for preparing lime for dosing and for using the prepared lime for dosing, comprising means to form from lime and water a pulp which is unstable as to its consistency, a settling tank, valve means to introduce said pulp into the tank, other valve means to withdraw from the lower part of the tank lime which has settled therein, a valve-controlled water inlet towards the top of the tank, a valve-controlled air pipe connecting the upper part of the tank with the atmosphere, and a separate valve to draw off from the tank the separated water constituent of the said pulp as well as water which has flowed into the tank, such separate valve being well below the upper end of the tank, and a channel for liquid to be dosed, and a pipe connecting the lower part of the tank and the channel to convey settled pulp withdrawn from the tank into the channel.

9. The process claimed in claim 6 in which withdrawal of the settled lime is recommenced immediately after introduction of the further pulp, and in which such introduction is effected while there is a sufficient body of settled lime in the tank for the further pulp to settle to a stable water-to-solid ratio before the body of settled lime is completely withdrawn.

10. The process claimed in claim 1 in which the settled lime is withdrawn for dosing by being displaced by pressure water introduced into the tank above the body of settled lime.

RICHARD PIERPONT MOORE.

(References on following page)

REFERENCES CITED

The following references are of record in the file of this patent:

UNITED STATES PATENTS

| Number | Name | Date |
|---|---|---|
| 495,313 | Dervaux | Apr. 11, 1893 |
| 748,308 | Reisert | Dec. 29, 1903 |
| 753,880 | Greth | Mar. 8, 1904 |
| 846,845 | Greth | Mar. 12, 1907 |
| 973,992 | Sutro | Oct. 25, 1910 |
| 996,313 | Greth | July 4, 1911 |
| 1,048,833 | Hickox et al. | Dec. 31, 1912 |
| 1,326,553 | Warriner | Dec. 30, 1919 |
| 1,716,205 | Bucher | June 4, 1929 |
| 1,866,031 | Green | July 5, 1932 |
| 2,080,872 | Paterson | May 18, 1937 |
| 2,362,606 | Albertson et al. | Nov. 14, 1944 |
| 2,367,228 | Lurie | Jan. 16, 1945 |

FOREIGN PATENTS

| Number | Country | Date |
|---|---|---|
| 10,394 | Great Britain | 1910 |
| 399,633 | Great Britain | Oct. 12, 1933 |
| 104,512 | Australia | Oct. 12, 1937 |
| 360,397 | France | Feb. 22, 1905 |